Oct. 30, 1945.   W. H. HUNTER   2,388,151
FRICTIONAL MECHANISM
Filed Dec. 3, 1943   2 Sheets-Sheet 1
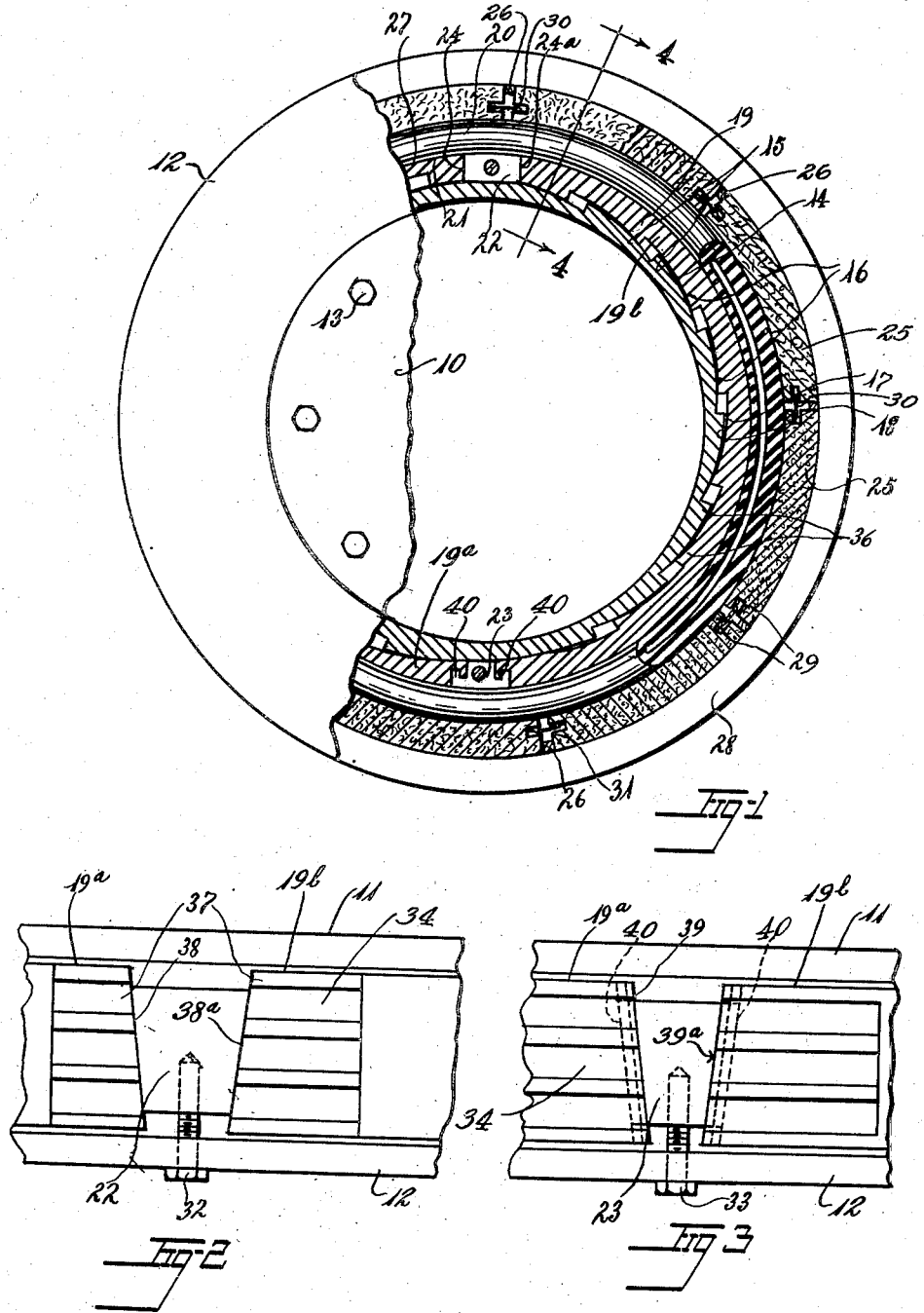
Inventor
Willson H. Hunter
By Willis F. Avery
Atty.

Oct. 30, 1945.  W. H. HUNTER  2,388,151
FRICTIONAL MECHANISM
Filed Dec. 3, 1943  2 Sheets-Sheet 2
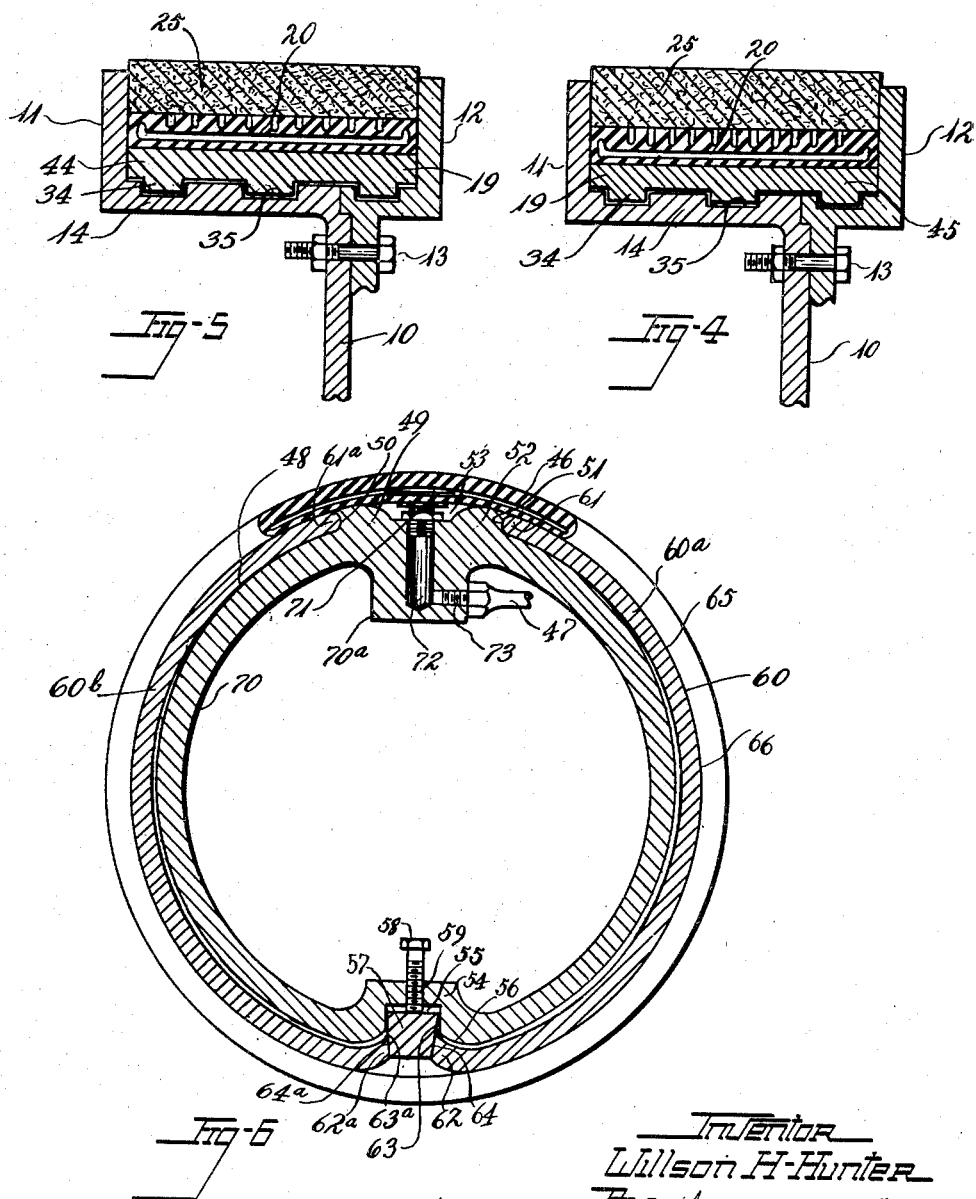
Inventor
Willson H. Hunter
By Willis F. Avery
Atty.

Patented Oct. 30, 1945

2,388,151

UNITED STATES PATENT OFFICE 2,388,151

FRICTIONAL MECHANISM

Willson H. Hunter, Lakewood, Ohio, assignor to The B. F. Goodrich Company, New York, N. Y., a corporation of New York Application December 3, 1943, Serial No. 512,719

14 Claims. (Cl. 188—152)

This invention relates to frictional mechanism for controlling movement of relatively rotatable bodies such as brakes, clutches and the like, and is especially useful in controlling movement of wheels of aircraft or other vehicles, especially where nicety of adjustment of the frictional mechanism is desired.

Objects of the invention are to provide effectively for brake adjustment, to provide a high degree of uniformity of adjustment about the circumference of the friction mechanism together with simplicity of adjusting means, to provide convenience of assembly and maintenance, to provide simplicity and compactness of structure, and to provide for dependable operation.

These and further objects will become apparent from the following description and accompanying drawings in which, Fig. 1 is a side elevation, partly broken away and partly in section, of a frictional mechanism constructed in accordance with and embodying the invention.

Fig. 2 is a detail view of an adjusting portion of the mechanism as seen from within looking radially outwardly from the inner torque member, parts being removed.

Fig. 3 is a view like Fig. 2 of another adjusting portion.

Fig. 4 is a section taken along the line 4—4 of Fig. 1.

Fig. 5 is a similar view with the parts in a differently adjusted position.

Fig. 6 is a side elevation of a modified form of the invention, parts being sectioned, and parts broken away.

Referring to the drawings which illustrate the invention as applied to a fluid-operated brake having concentric relatively rotatable members, and first to Figs. 1 to 5 thereof, the relatively rotatable brake members are shown as a torque frame 10 and a drum 28 thereabout, one of which is rotatable with respect to the other.

The torque frame 10 comprises a generally cylindrical member having a fixed flange 11 (see Figs. 4 and 5) and a removable flange 12 fastened together by bolts 13 and defining an outwardly facing annular channel 14. A series of spaced-apart, inclined wedge surfaces 15 are provided at the bottom or outer face of the channel 14. A sectional adjusting ring 19, formed of two or more sections 19a, 19b have a series of cooperating wedge surfaces 16 about the inner circumstance thereof located at corresponding intervals throughout the circumference, so that the wedge surfaces 16 of the ring 19 can slide over the wedge surfaces 15 at the bottom of the torque frame 10 for adjusting the ring 19 radially. For adjusting the ring 19 circumferentially, wedges 22 and 23 are disposed between adjacent ends 24, 24a of the ring sections 19a, 19b. The ring sections may be shifted from time to time radially outward and the wedge surfaces moved to maintain adjustment between the cooperating frictional surfaces of the members. An annular expander tube 20 is disposed in the channel so that its inner peripheral face 21 is on the outer peripheral face 27 of the ring 19. A series of friction elements 25 having axially extending end slots 29 is arranged over the expander tube 20. The elements are restrained from circumferential displacement by a series of torque lugs 26 extending inwardly of the channel 14 and disposed between the adjacent end faces of successive elements so that as the expander tube is inflated by a source of fluid pressure to urge the elements 25 into frictional engagement with the rotatable drum 28, the elements 25 cannot circumferentially shift excessively in the channel 14. Slots 29 in the ends of the elements receive leaf retractor springs 30 to urge the friction elements 25 radially inward from the drum 28 to a smaller diameter when fluid pressure is released from the expander tube 20 for retraction.

The leaf retractor springs 30 also bridge the space between adjacent friction elements 25 and thus shield the expander tube 20 from heat radiated from the drum 28.

The adjusting wedge 22 has tapered faces for engaging correspondingly tapered ends 38, 38a of the segments 19a, 19b, and is shorter in length than the width of the channel 14, so that as adjusting bolt 32, which extends through a flange and engages in a threaded opening in the wedge, is rotated for adjusting purposes, the wedge 22 can be shifted the desired amount to move the segments 19a, 19b circumferentially. The ring 19 may be provided with annular ribs 34 on its inner face to ride in annular channels 35 at the bottom of the torque frame channel for guiding the ring 19 in the channel.

The end faces 39, 39a of segments 19a, 19b shown in Fig. 3 as cooperating with the wedge 23 may be of the same construction as the faces 38, 38a. The wedges 22 and 23 may have, if desired, an interlocking tongue and groove connection 40 with the ring sections 19a, 19b for added control of the adjustment.

When the adjusting bolt 33 is turned into the tapped hole of the wedge 23, the wedge moves and displaces the ring sections 19a, 19b radially outward to a larger diameter, as movement in this direction moves the surfaces 16 of the ring 19 to the thicker portions of the cooperating wedge surfaces 15 of the torque frame 10. Turning the screw 33, in the other direction adjusts the ring sections radially inward. The screw 32 of the wedge member 22 is turned to accommodate the adjustment. Different positions of adjustment are illustrated in Figs. 4 and 5, Fig. 4 showing a relatively thin portion 45 of the adjusting ring over a portion of the channel 14, and Fig. 5 showing the adjusting ring moved to a position where a thicker portion 44 thereof is over the same portion of the channel. The adjustment of the bolts 32 and 33 provide means to shift the ring 19 circumferentially of the torque frame 10 and maintain substantial concentricity of the ring 19 so that as the friction elements 25 become worn, the clearance between the blocks 25 and the drum 28 can be kept substantially the same, this being of advantage especially in maintaining the fluid displacement of the system substantially constant.

Referring to the embodiment of Fig. 6 an annular torque frame 70 has a boss 70a extending inwardly from its inner periphery. The boss 70a has inter-communicating channels 72 and 73 formed therethrough to connect a nozzle 71 of an expander tube 46 to a source of fluid pressure (not shown) through the pipe 47 for inflating the expander tube 46. The outer periphery 48 of the torque frame 70 has an outwardly projecting lug 49 having an undercut axially extending margin or shoulder 50. Another axial lug 52 of like construction but facing in the opposite direction is located parallel with the axial lug 49 but spaced therefrom so that a shoulder 51 is provided. Diametrically opposite the boss 70a is another boss 54 extending inwardly of the frame 70. The boss 54 has a recess 55 extending inwardly from the outer periphery 48 of the torque frame 70 adapted to retain a thrust wedge 57 movable radially therein.

An adjusting screw 58 is threaded through a tapped hole 59 of the torque frame in position to engage with thrust wedge 57 to move it radially of the torque frame. An adjustment ring 60 divided to provide section 60a, 60b, has ends 61, 61a adapted to seat and pivot respectively in undercut margins 50, 51 of the lugs 49 and 52. The other ends 62, 62a are turned inwardly to clear the expander tube and are radially tapered as at 63, 63a to engage the faces 64, 64a of the thrust wedge 57. The arrangement is such that the ring sections 60a, 60b and the outermost surface of the lugs 49, 52 present a substantially circumferential surface concentric with the torque frame for seating the expander tube upon it. Friction elements (not shown) may be disposed upon the tube for cooperation with a drum, as described with reference to the embodiment of Figs. 1 to 5.

As the bolt 58 is tightened, the wedge 57 moves radially outward in the recess 55 causing the opposing faces 63, 63a of the ring 60 to slide on the opposing faces 64, 64a of the thrust wedge 57 to move the ends 62, 62a farther apart, thus forcing the expander tube 46 to a position more remote from the torque frame 70. Movement of the screw 58 in the reverse direction permits a decrease of the circumference of the adjusting ring.

Variations may be made without departing from the scope of the invention as it is defined by the following claims.

I claim:
1. In a frictional mechanism having a pair of relatively rotatable members and a friction element carried by one member for frictionally engaging a surface of the other member, apparatus for providing adjustment of said element radially with respect to said members, said apparatus comprising an annular support, a movable member upon the support heaving an arcuate outer face, an expander upon said face for operating the friction element, and wedge means for adjusting the position of said movable member relative to said support to alter the radial position of said expander.

2. In a frictional mechanism as defined in claim 1 in which the wedge means is movable in the radial direction of the assembly.

3. In a frictional mechanism as defined in claim 1 in which the wedge means is movable in the axial direction of the assembly.

4. In a friction mechanism having a pair of concentric relatively rotatable members, an expander tube located between the members, and a series of friction elements on the expander tube for frictionally engaging one of the members, a sectional adjusting structure upon one of the concentric members, said adjusting structure and its supporting concentric member having a plurality of cooperating inclined surfaces, and means for moving said adjusting structure rotatively with respect to its supporting member to adjust the space between said concentric members.

5. A brake structure comprising a torque member having an outwardly facing annular channel, a brake drum concentric with said channel and arranged thereabout, a series of friction elements retained in said channel against circumferential movement and movable radially thereof, an expander in said channel for radially moving said friction elements, and an adjusting ring seated in said channel beneath said expander, said adjusting ring comprising arcuate ring sections, and means for simultaneously adjusting said arcuate sections radially toward and from said expander.

6. A brake structure comprising a torque member having an outwardly facing annular channel, a brake drum, a series of friction elements retained in said channel against circumferential movement and movable radially thereof, an expander in said channel for radially moving said friction elements, and an adjusting ring seated in said channel beneath said expander, and means for simultaneously adjusting said sections toward and from said expander, said last named means comprising a series of cooperating inclined wedge surfaces on said adjusting ring and said torque member, and means for moving said ring circumferentially of said channel to change the contacting relation of said inclined wedge surfaces.

7. A brake structure comprising a torque member having an outwardly facing annular channel, a brake drum, a series of friction elements retained in said channel against circumferential movement and movable radially thereof, an expander tube in said channel for radially moving said friction elements, and an adjusting ring seated in said channel beneath said expander tube, said adjusting ring comprising ring sections, and means for simultaneously adjusting said sections toward and from said expander tube, said last named means comprising a series of cooperating inclined wedge surfaces on said adjusting ring and said torque member, and means for moving said ring sections circumferentially of said channel to change the contacting relation of said inclined wedge surfaces.

8. A frictional mechanism comprising a torque frame having a series of spaced circumferential wedge surfaces integral with a face thereof, an adjusting ring having opposing tapered ends and a series of circumferentially spaced wedge surfaces, said wedge surfaces on said ring being so positioned as to engage with said wedge surfaces on the torque frame, and a wedge disposed between said tapered ends of said ring for adjusting the ring along the torque frame.

9. A frictional mechanism comprising a torque frame having a series of spaced-apart circumferential wedge surfaces integral with a face of said torque frame, a series of adjusting segments with inclined ends, said segments having cooperating wedge surfaces to engage the wedge surfaces of said torque frame, wedges disposed between the ends of said segments for adjusting the segments circumferentially of said torque frame, means for moving said wedges axially of said torque frame, an expander tube on said segments, and a series of friction elements on said tube.

10. A frictional mechanism comprising a torque frame having a shoulder with a concave notch, an adjusting member comprising a rounded end adapted to pivot on said notch of said shoulder, and means for adjustably moving said member in the radial direction about said shoulder.

11. A frictional mechanism comprising an annular torque frame having projecting shoulders, a divided adjusting ring about said torque frame having a pair of adjacent ends adapted to pivot on said axial shoulders, another pair of adjacent ends of the ring being tapered, a wedge adapted to move radially between said tapered ends of said divided ring to expand the ring, means for moving said wedge in relation to said frame, an expander upon said ring, a series of friction elements on said expander, torque means on said torque frame for circumferentially retaining said blocks, springs for radially retracting said blocks, and a cooperating friction member mounted over said elements for frictional engagement with the same.

12. In a frictional mechanism having a pair of relatively rotatable members, a friction element carried by one member for frictionally engaging a surface of the other member, and an inflatable annular tube on said one member for applying braking pressure to said friction element, means for adjusting said tube and said element with respect to said other member, said means comprising a support having an arcuate face for supporting said inflatable tube and said friction element from said one member, and means bodily movable with respect to said one member for moving said support relative thereto to effect initial radial adjustment of said tube and friction element.

13. In a frictional mechanism having a pair of relatively rotatable members and a friction element carried by one member for frictionally engaging a surface of the other member, apparatus for moving said element radially with respect to said members, said apparatus comprising a support, moveable segmental members upon the support having arcuate outer faces, said segmental members each having a circumferentially moveable portion, an expander upon said faces for operating the friction element, and means for moving said segmental members with relation to said support to alter the radial position of said expander.

14. In a frictional mechanism having a pair of relatively rotatable members and a friction element carried by one member for frictionally engaging a surface of the other member, apparatus for moving said element radially with respect to said members, said apparatus comprising a support, moveable segmental members upon the support having arcuate outer faces, said segmental members being bodily moveable in a circumferential direction, an expander upon said faces for operating the friction element, and means for moving said segmental members with relation to said support to alter the radial position of said expander.

WILLSON H. HUNTER.